US010411573B2

(12) United States Patent
Stauder et al.

(10) Patent No.: US 10,411,573 B2
(45) Date of Patent: Sep. 10, 2019

(54) PERMANENT-MAGNET SYNCHRONOUS MACHINE AND MOTOR VEHICLE SYSTEM

(71) Applicant: Continental Teves AG & Co. oHG, Frankfurt (DE)

(72) Inventors: Peter Stauder, Mainz (DE); Mathias Hochheim, Reiskirchen (DE); Timo Sauerwald, Herborn (DE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/606,383

(22) Filed: May 26, 2017

(65) Prior Publication Data

US 2017/0264178 A1 Sep. 14, 2017

Related U.S. Application Data

(63) Continuation of application No. PCT/EP2015/070585, filed on Sep. 9, 2015.

(30) Foreign Application Priority Data

Nov. 28, 2014 (DE) .......................  10 2014 224 432

(51) Int. Cl.
*H02K 1/00* (2006.01)
*H02K 21/24* (2006.01)
*H02K 3/18* (2006.01)
*H02K 11/33* (2016.01)
*H02P 25/22* (2006.01)
*H02K 11/21* (2016.01)
*H02P 6/08* (2016.01)
(Continued)

(52) U.S. Cl.
CPC ............... *H02K 21/24* (2013.01); *H02K 3/18* (2013.01); *H02K 11/21* (2016.01); *H02K 11/33* (2016.01);
(Continued)

(58) Field of Classification Search
CPC ............ H02K 3/28; H02K 19/22; H02K 3/02; H02K 15/0485
(Continued)

(56) References Cited

U.S. PATENT DOCUMENTS 2,825,828 A 3/1958 Wei-Ching
4,296,344 A 10/1981 Rabe
(Continued)

FOREIGN PATENT DOCUMENTS

CN 1972079 A 5/2007
CN 101728884 A 6/2010
(Continued)

OTHER PUBLICATIONS

Office Action dated Feb. 8, 2018 for corresponding Chinese Patent Application No. 201580064421.3.

*Primary Examiner* — Thanh Lam

(57) ABSTRACT

A permanent-magnet synchronous machine comprises a rotor and a stator for holding at least one first stator winding and a second stator winding which is electrically insulated from said first stator winding. The second stator winding has a smaller conductor cross section and a larger number of turns than the first stator winding, wherein a first operating voltage is provided for motor operation of the first stator winding and a second operating voltage is provided for motor operation of the second stator winding. The second operating voltage has a higher rated voltage than a rated voltage of the first operating voltage.

16 Claims, 7 Drawing Sheets

(51) Int. Cl.
  *H02K 16/02* (2006.01)
  *H02P 25/18* (2006.01)
  *H02K 11/20* (2016.01)
  *B60T 13/74* (2006.01)
  *H02K 3/04* (2006.01)
  *H02K 21/02* (2006.01)
  *H02K 21/12* (2006.01)

(52) U.S. Cl.
  CPC .............. *H02P 6/085* (2013.01); *H02P 25/22* (2013.01); *B60T 13/74* (2013.01); *H02K 3/04* (2013.01); *H02K 11/20* (2016.01); *H02K 16/02* (2013.01); *H02K 21/02* (2013.01); *H02K 21/12* (2013.01); *H02K 2213/06* (2013.01); *H02P 25/184* (2013.01)

(58) Field of Classification Search
  USPC ................. 310/179–180, 184, 198, 201, 208
  See application file for complete search history.

(56) References Cited

U.S. PATENT DOCUMENTS

| | | | | |
|---|---|---|---|---|
| 2005/0029889 | A1* | 2/2005 | Holmstrom | H02K 1/165 310/179 |
| 2006/0022544 | A1* | 2/2006 | Kinashi | H02K 3/28 310/179 |
| 2006/0197398 | A1* | 9/2006 | Maynez | H02K 3/12 310/198 |
| 2012/0146447 | A1* | 6/2012 | Seguchi | H02K 3/12 310/198 |
| 2013/0057106 | A1* | 3/2013 | Sajikawa | H02K 3/18 310/208 |
| 2014/0103850 | A1 | 4/2014 | Frank | |
| 2014/0346914 | A1* | 11/2014 | Funasaki | H02K 3/28 310/198 |
| 2015/0188371 | A1* | 7/2015 | Kato | H02K 3/18 310/208 |

FOREIGN PATENT DOCUMENTS

| | | |
|---|---|---|
| CN | 101752930 A | 6/2010 |
| DE | 3740767 A1 | 6/1989 |
| DE | 4334932 A1 | 5/1994 |
| DE | 19704504 A1 | 8/1998 |
| DE | 19960611 A1 | 6/2001 |
| DE | 19961760 A1 | 7/2001 |
| DE | 102013208570 A1 | 11/2014 |
| JP | H0974701 A | 3/1997 |
| JP | 2010268632 A | 11/2010 |
| WO | WO8403400 A1 | 8/1984 |

* cited by examiner

US 10,411,573 B2

PERMANENT-MAGNET SYNCHRONOUS MACHINE AND MOTOR VEHICLE SYSTEM

CROSS-REFERENCE TO RELATED APPLICATION

This application No. PCT/EP2015/070585, filed Sep. 09, 2015, which claims the benefit of German patent application No. 10 2014 224 432.3, filed Nov. 28, 2014, all of which are hereby incorporated by reference herein.

TECHNICAL FIELD

The invention relates to a permanent-magnet synchronous machine having a rotor and stator and to a motor vehicle system.

BACKGROUND

A motor vehicle system, for example a braking or steering system, which is suitable for automatic operation requires a redundant power supply, i.e. a power supply delivered by two on-board networks, such that the operation of a system or a plurality of systems can be maintained, even in case of faults or outages (functional security). Internal redundancy in respect of actuator technology and power electronics is also required.

From DE 19960611 A1, an electromechanical braking system is known, having a generic brushless DC motor for two independent on-board networks with an identical voltage level of 2×12 V, in which the stator winding is subdivided into at least two separate windings with respectively equal numbers of turns, such that each part of the stator winding can be connected to one of said on-board networks via a respective power electronics circuit. By this subdivision of the stator winding according to the number of independent on-board networks in a vehicle, a plurality of mutually-independent half-motors are formed such that, in case of the failure of one of the two on-board systems, a half-motor can continue to operate using the other on-board network, with reduced output power.

In a brushless DC motor of this type according to DE 19960611 A1, subdivision of the stator winding is achieved by means of taps on the continuous winding. However, the voltage supplies are required to operate at different levels. As a result of the lack of mechanical separation of the coil windings associated with the two on-board networks, however, potential faults affecting the control thereof cannot be excluded, such that genuine redundancy is not achieved.

The divided stator windings provided for the two on-board networks are configured as separate windings, which are mutually overwound or interwound, wherein, for each of these separate windings, an output stage is provided, with six circuit-breakers. By overwinding or interwinding, however, a short-circuit associated with the contact of wires, which would affect both half-motors and compromise the availability thereof, cannot be ruled out. To date, it has consistently been required that, insofar as possible, both half-motors should perform identically and, accordingly, are operated using two output stages of identical design and substantially identical controllers. Moreover, for future applications, on-board systems with higher rated voltages than the customarily-applied 12 V or 14 V are envisaged for which, in many cases, no redundancy is to be provided.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Thus, a permanent-magnet synchronous machine and a motor vehicle system with improved functional security, specifically for use with non-redundant on-board vehicle networks of higher rated voltages is provided.

A permanent-magnet synchronous machine comprises a rotor and a stator for holding at least one first stator winding and a second stator winding which is electrically insulated from said first stator winding. The second stator winding has a smaller conductor cross-section and a larger number of turns than the first stator winding, wherein the first stator winding is provided for motor operation with a first operating voltage, and the second stator winding is provided for motor operation at a second operating voltage with a higher rated voltage than a rated voltage of the first operating voltage.

An improved functional security is thus achieved, specifically in applications involving on-board vehicle networks of higher rated voltage and non-redundant design. In normal duty, the synchronous motor according to the invention is supplied by both on-board networks such that, in the event of the failure or malfunction of the two on-board networks, the synchronous machine can be operated using the remaining intact on-board network.

For the first and second stator winding, a dedicated converter is provided for the respective control thereof which, in a known manner, can be configured with six power semiconductors. Accordingly, these converters for the control of the stator windings are not of identical design, but are adapted in accordance with the relevant voltage, specifically with respect to current-carrying capacity, wherein, for example in the case of a lower voltage—in accordance with the torque to be generated by the respective half-motor—the transmission of a higher current must be possible. The power semiconductors are designed correspondingly. Accordingly, the term half-motor is not to be understood restrictively in the sense of exactly one half (50%), as the division can be executed in consideration, for example, of safety requirements in the event of an outage or a malfunction.

Preferably, the connection of the first stator winding differs from that of the second stator winding, specifically in that the first stator winding (of lower rated voltage) is star-connected and the second stator winding (of higher rated voltage) is delta-connected. This results in a smaller difference in conductor diameter and, on the motor side with the higher voltage, the number of turns is smaller, thereby resulting in a saving in manufacturing time.

According to one embodiment, the stator of the permanent-magnet synchronous machine comprises a plurality of stator poles, separated by slots, for the accommodation of the at least first and second stator windings, wherein the first stator winding is arranged on a first group of stator poles, and the second stator winding is arranged on a group of stator poles which is separate from the first group.

Each stator pole either has a winding configured as a first stator winding or a winding configured as a second stator winding, wherein electrical insulation, and thus redundancy, is further improved in a simpler manner.

The number of stator poles in the first group has a specific ratio to the number of stator poles in the second group, which is dependent upon the number of stator poles. Thus, for example, an even number of stator poles on the stator can be divided in half, such that both the first group and the second group comprise an equal number of stator poles. A different ratio of division can be selected, for example 3/4 to 1/4, in the case of a stator with 12 slots and an 8-pole rotor, or 2/3 to 1/3 in the case of a stator with 9 slots and a 6-pole rotor. The synchronous motor can thus be adapted to the performance capability of the two on-board networks.

According to one configuration, the stator with its first and second stator windings is configured such that the stator poles of the first and second group are arranged in a consecutive sequence, wherein the first group of stator poles and the second group of stator poles preferably constitute one half of the stator poles of the stator respectively.

According to a further configuration, it is proposed that the stator poles of the first group and the stator poles of the second group are arranged in an alternating manner. The exceptionally quiet running of the synchronous motor at both operating voltages can thus be achieved.

Finally, according to a further configuration, it is proposed that two, or a multiple of two adjoining stator poles in the first group and the second group are arranged in an alternating manner. Thus, for example, two adjoining stator poles accommodate a winding of the first stator winding, the consecutive two adjoining stator poles accommodate a winding of the second stator winding, etc. This results in the symmetrical loading of the synchronous motor, with a simultaneous reduction in localized saturation, specifically if said synchronous motor is to be operated at one on-board network voltage only.

The invention moreover relates to a motor vehicle system, to which at least one permanent-magnet synchronous machine is assigned, and having at least two independent voltage supplies with a first and second operating voltage, wherein the first operating voltage for the supply of a first stator winding of the permanent-magnet synchronous machine has a lower rated voltage than a second operating voltage for the supply of a second stator winding of the permanent-magnet synchronous machine.

The rated voltage of the first operating voltage is preferably double that of the rated voltage of the second operating voltage. Specifically, the rated voltage of the first operating voltage is of the order of 48 V, and the rated voltage of the second operating voltage is of the order of 12 V.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The invention is clarified and described in greater detail hereinafter with reference to the attached figures, wherein.

DETAILED DESCRIPTION

Figure 1:
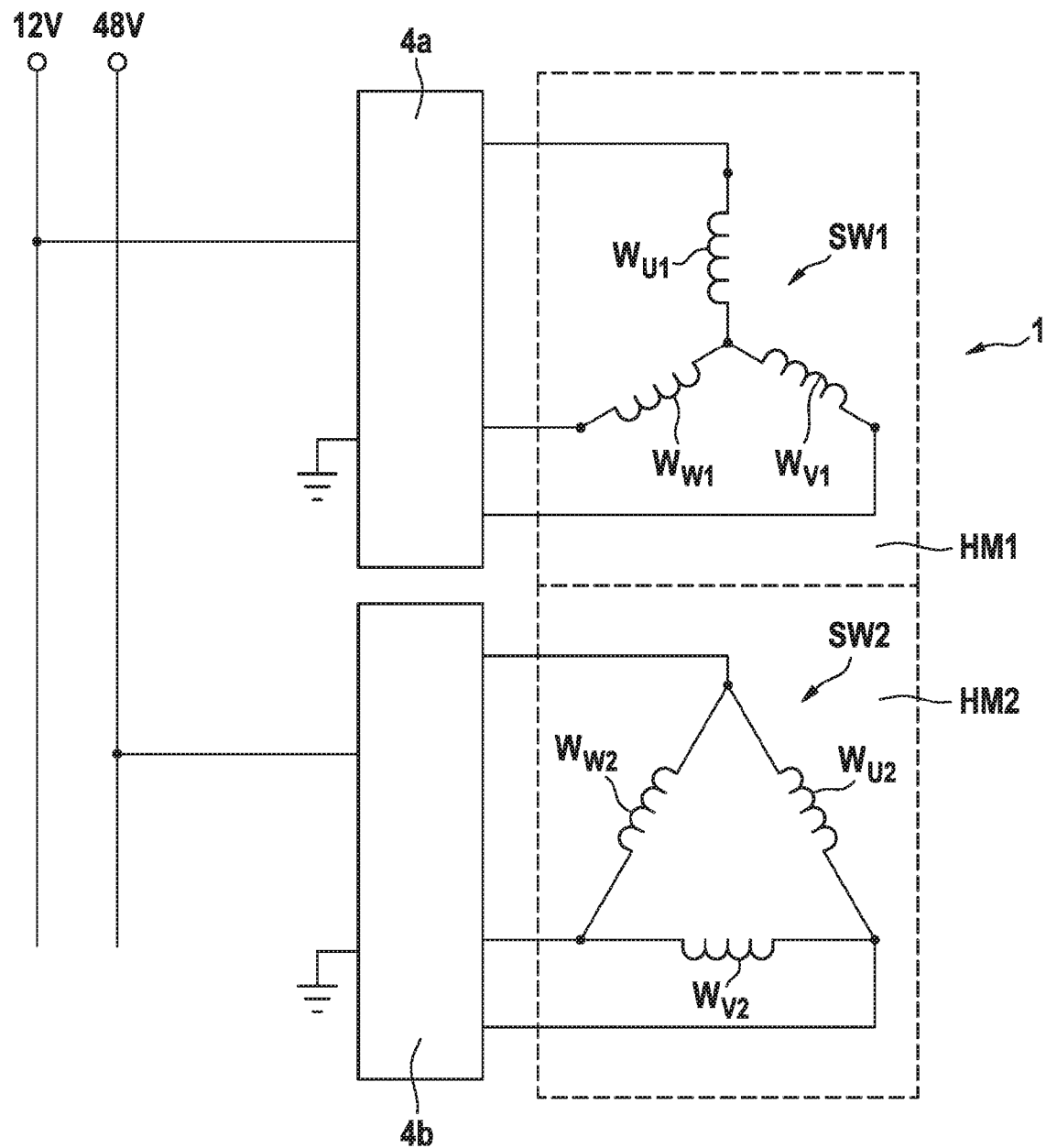
FIG. 1 shows a schematic circuit diagram of the drive circuit of a permanent-magnet synchronous machine with two on-board network voltages of different rated voltage and with divided stator windings.

FIG. 1 shows a schematic circuit diagram of the drive circuit of a permanent-magnet synchronous machine 1 which, in motor operation, is supplied with energy by means of two separate on-board networks in a vehicle, or by an on-board network having a rated voltage of 12 V and a second on-board network having a rated voltage of 48 V. Control is executed in an exemplary manner by means of the converters 4a and 4b, which deliver control signals via at least one unrepresented control unit. The stator winding of the permanent-magnet synchronous machine 1 is divided into a first stator winding SW1 and a second stator winding SW2, wherein a first half-motor HM1 and a second half-motor HM2 are constituted, both of which are configured for the generation of a torque on the rotor 2 (FIG. 2) of the synchronous machine. The stator winding SW1 is star-connected, and the stator winding SW2 is delta-connected. The two stator windings SW1 and SW2 of the half-motors HM1 and HM2 can also both be delta-connected, or can both be star-connected. Each of the U-, V- and W-terminals of the half-motors HM1 and HM2 are connected respectively to one of the two half-bridges comprised of two semiconductor switches (not represented) in the converters 4a or 4b, such that each half-motor HM1 and HM2 is controlled by 6 power semiconductors.

The stator winding SW2 for the higher on-board network voltage has a reduced conductor cross-section, in comparison with the stator winding SW1 for the lower on-board network voltage. The space factor of the stator windings in both half-motors HM1 and HM2 is essentially equal. Motor control for the two half-motors HM1 and HM2 is executed independently, with appropriately-adapted setpoint torques in each case.

Figure 2:
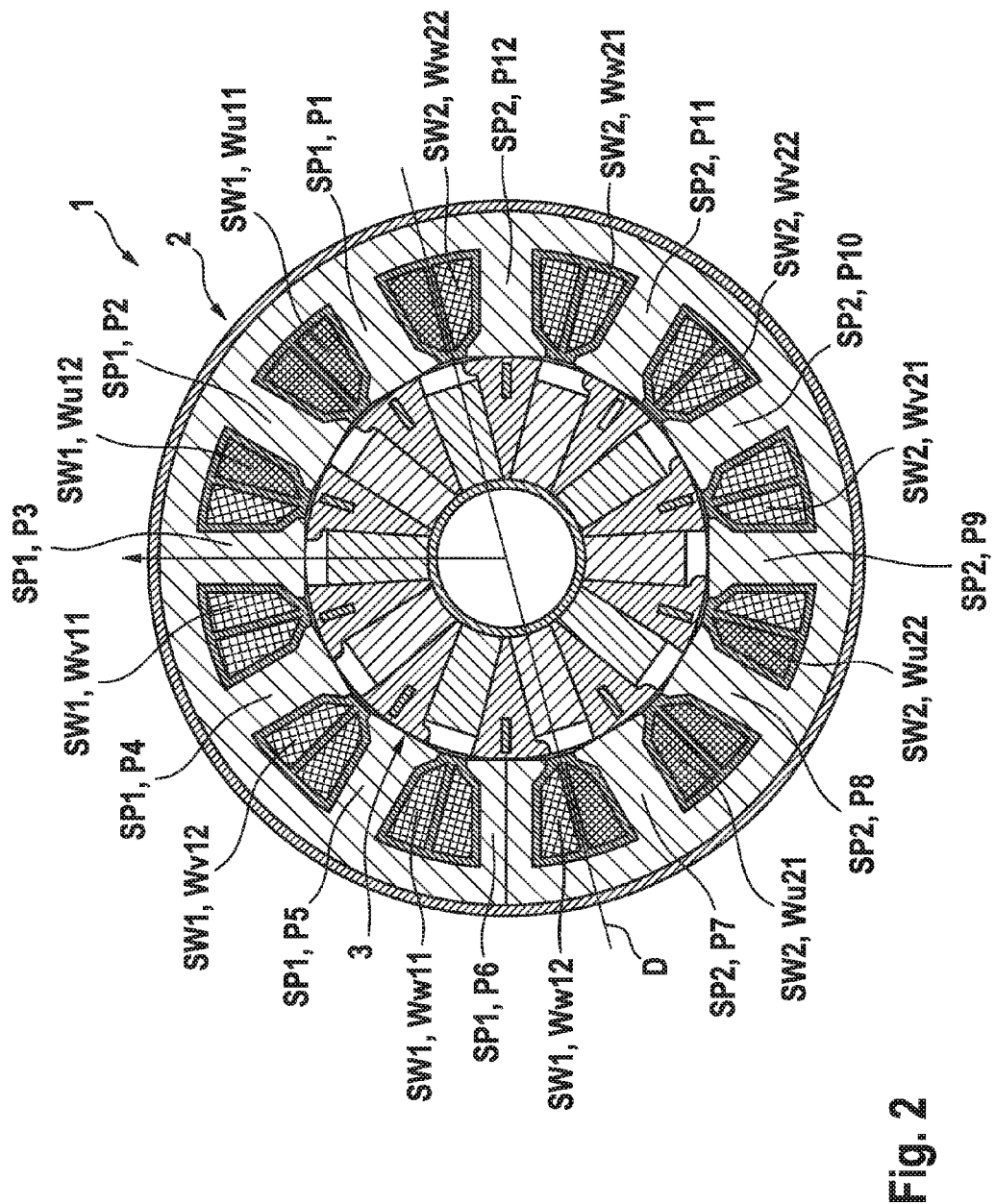
FIG. 2 shows a cross-sectional representation of a permanent-magnet synchronous machine according to the invention.

FIG. 2 shows a cross-sectional representation of the permanent-magnet synchronous machine 1. The latter comprises a stator 2 with 12 stator poles P1 to P12, separated by slots, and a 10-pole rotor 2. The stator winding of the stator 2 is divided into a first stator winding SW1 arranged on a first group SP1 of stator poles P1 to P6, with the windings Wu11, Wu12, Wv11, Wv12, Ww11, Ww12, and a second stator winding SW2 arranged on a second group SP2 of stator poles P7 to P12, which is separate from the first group, with the windings Wu21, Wu22, Wv21, Wv22, Ww21, Ww22. On each of these stator poles P1 to P12 respectively, only one winding of the first stator winding SW1 or of the second stator winding SW2 is arranged. The first group SP1 of stator poles P1 to P6 and the second group SP2 of stator poles P7 to P12 are respectively arranged in a consecutive sequence, such that the stator 2 is divided in half by the first and second groups of stator poles SP1 and SP2, as represented in FIG. 2 by the line D. Accordingly, by each of these groups SP1 and SP2 of stator poles, in combination with the respective windings of the first stator winding SW1 or SW2, the first half-motor HM1 and the second half-motor HM2 are constituted.

The stator windings Wu11, Wu12, Wv11, Wv12, Ww11, Ww12 and Wu21, Wu22, Wv21, Wv22, Ww21, Ww22 associated with each half-motor HM1 and HM2 are connected to the 12 V on-board network or to the 48 V on-board network by means of the respective converter 4a or 4b. The associated winding diagram of the stator 2 for phase U of the half-motor HM1 and the half-motor HM2 are represented in FIG. 3.

Figure 3:
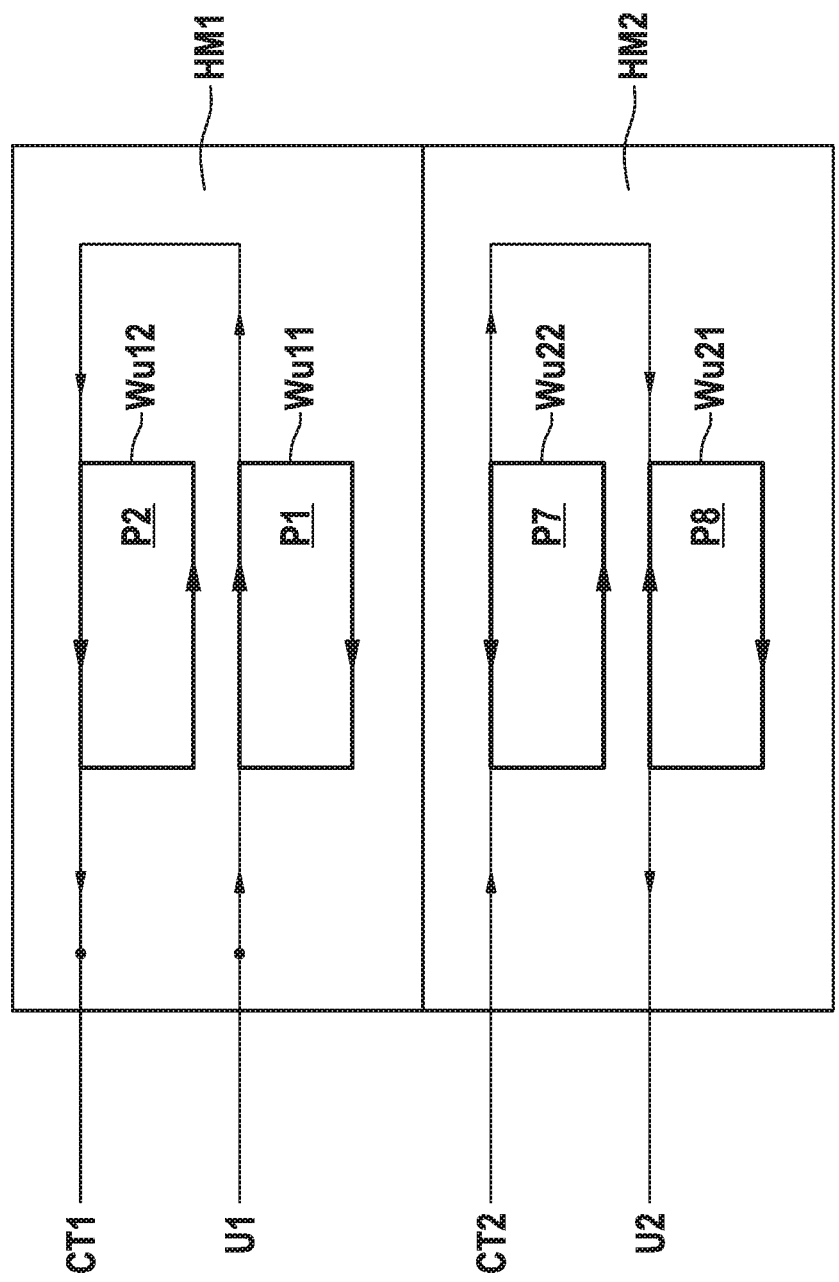
FIG. 3 shows a winding diagram of the stator of the synchronous motor according to FIG. 1.

According to FIG. 3, the winding Wu11 of the stator pole P1 and the winding Wu12 of the stator pole P2 of phase U are each formed of 10 turns, wherein the winding Wu11 is supplied with the on-board network voltage U1 of the 12 V on-board network, and the winding Wu12 is routed to a star point CT1 on the 12 V on-board network. The windings Wv11 and Wv12 for phase V and the windings Ww11 and Ww12 for phase W are correspondingly wound and connected for the half-motor HM1.

As the half-motor HM2 is operated on the 48 V on-board network, the windings Wu21 and Wu22 have 40 turns respectively. The winding Wu21 is wound on the stator pole P7 and, in the case of star-connection, is connected to a star point CT2 on the 48 V on-board system. The winding Wu22 is wound onto the directly consecutive stator pole P8, and is connected to the on-board network voltage U2 of the 48 V on-board network. For the half-motor HM2, the windings Wv21 and Wv22 for phase V and the windings Ww21 and Ww22 for phase W are wound and connected in a corresponding manner.

A halved division of the stator poles in a stator 2 with 12 slots is also possible in the case of an 8-pole rotor 3. Thus, a first stator winding SW1 with the windings Wu11, Wv11, Ww11, Wu12, Wv12 and Ww12 is wound onto the stator poles P1 to P6 in the sequence described, and a second stator winding SW2 with the windings Wu21, Wv21, Ww21, Wu22, Wv22 and Ww22 is arranged on a second group of stator poles P7 to P12, which is separate from the first group, in the sequence described.

Figure 4:
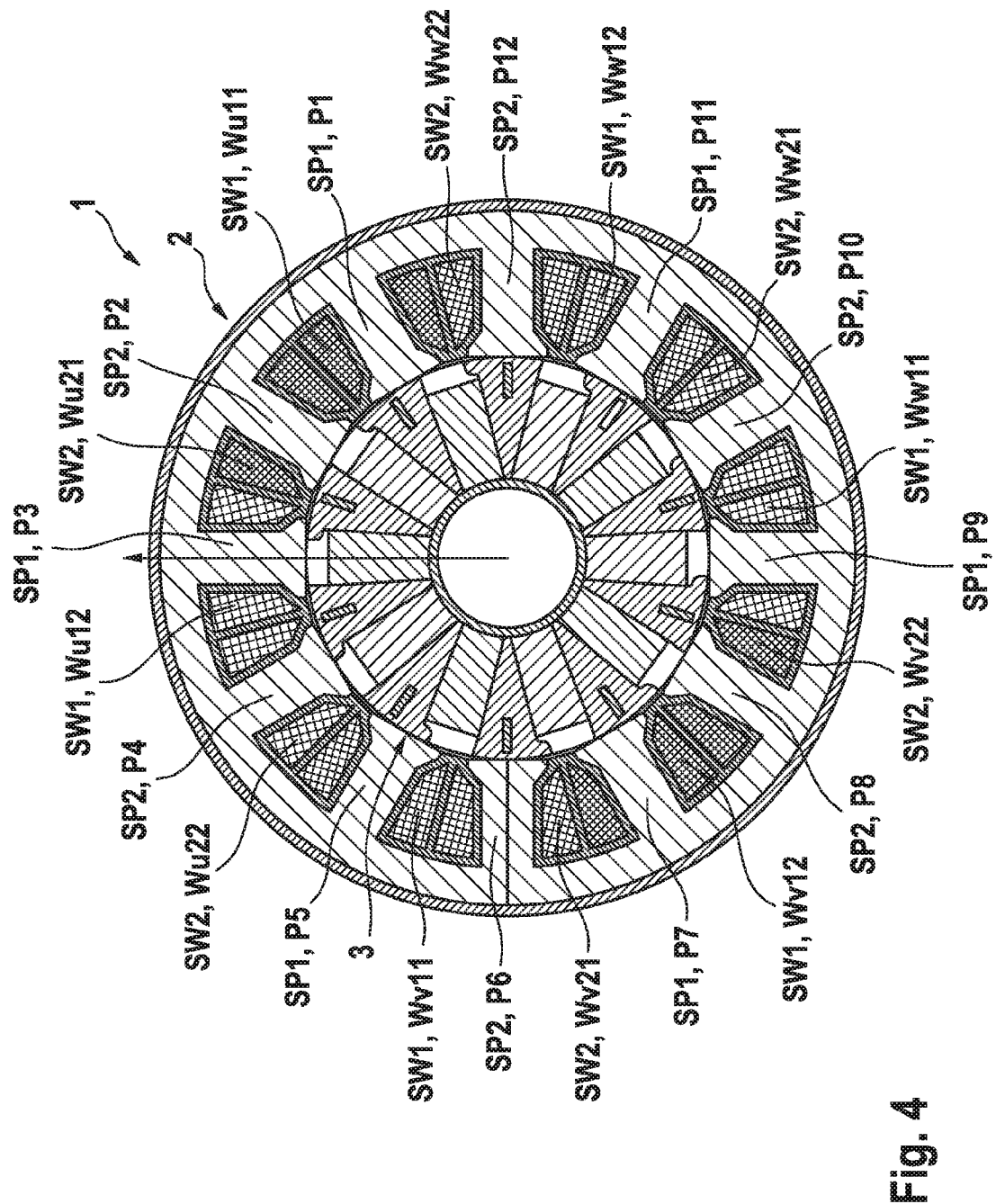
FIG. 4 shows a cross-sectional representation of a further permanent-magnet synchronous machine.

FIG. 4 represents a permanent-magnet synchronous machine 1 having a stator 2 and a rotor 3 wherein, in accordance with the synchronous motor 1 in FIG. 2, the stator 2 is configured with 12 stator poles P1 to P12, and the rotor 3 with 10 magnet poles. However, the synchronous motor 1 according to FIG. 2 is not divided into two halves by the first and second stator windings.

According to FIG. 4, the windings Wu11, Wu12, Wv11, Wv12, Ww11, Ww12 of the first stator winding SW1, connected to the 12 V on-board network, and the windings Wu21, Wu22, Wv21, Wv22, Ww21, Ww22 of the second stator winding SW2, connected to the 48 V on-board network, are wound onto the stator poles P1 to P12 in an alternating manner. Accordingly, winding Wu11 is arranged on stator pole P1, winding Wu21 on stator pole P2, winding Wu12 on stator pole P3, winding Wu22 on stator pole P4, winding Wv11 on stator pole P5, winding Wv21 on stator pole P6, winding Wv12 on stator pole P7, etc. The stator poles P1, P3, P5 etc. thus constitute a first group SP1 of stator poles, and the stator poles P2, P4, P6 etc. constitute a second group SP2 of stator poles, which is separate from the latter.

Again, in this embodiment of a permanent-magnet synchronous machine 1, the windings Wu11, Wu12, Wv11, Wv12, Ww11, Ww12 of the first stator winding SW1 and the windings Wu21, Wu22, Wv21, Wv22, Ww21, Ww22 of the second stator winding SW2 are star-connected, and are respectively connected to the 12 V on-board network or to the 48 V on-board network via a converter 4a, 4b comprised of 6 power semiconductors. Delta connection, rather than star connection, is also possible.

Figure 5:
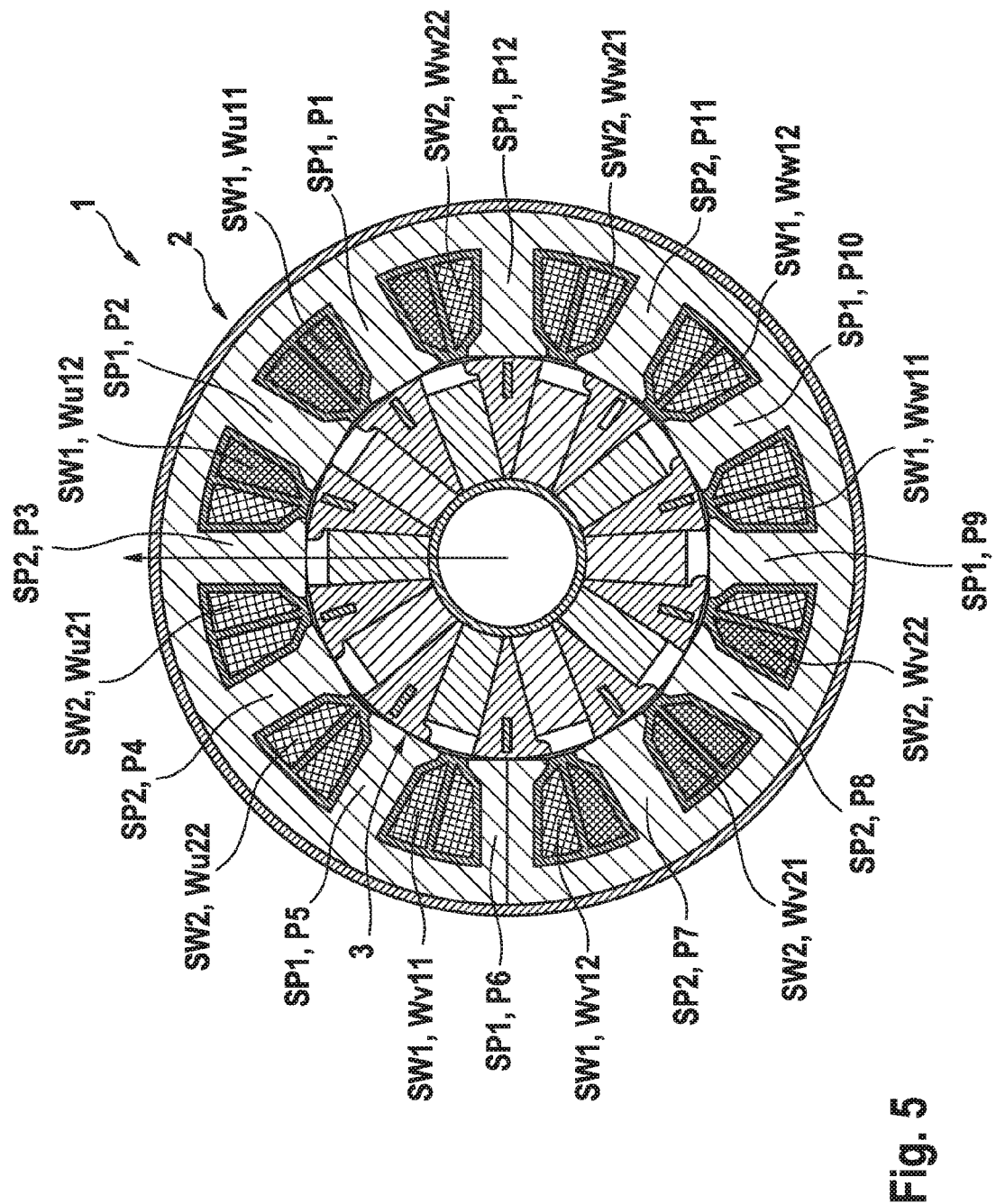
FIG. 5 shows a cross-sectional representation of a further permanent-magnet synchronous machine.

Again, the stator winding of the permanent-magnet synchronous machine 1 according to FIG. 5 is not divided, such that the stator 2 is divided into two halves by the first and second stator windings. In this case, the division of the stator winding is configured such that two windings Wu11, Wu12, Wv11, Wv12, Ww11, Ww12 of the first stator winding SW1 alternate with two windings Wu21, Wu22, Wv21, Wv22, Ww21, Ww22 of the second stator winding SW2. Thus, according to FIG. 5, the windings Wu11, Wu12 of the first stator winding SW1 are arranged on the adjoining stator poles P1 and P2, the windings Wu21, Wu22 of the second stator winding SW2 are arranged on the next adjoining stator poles P3 and P4, further windings Wv11, Wv12 of the first stator winding SW1 are arranged on the next adjoining stator poles P5 and P6, etc. The stator poles P1, P2, P5, P6 etc. thus constitute a first group SP1 of stator poles, and the stator poles P3, P4, P7, P8 etc. constitute a second group SP2 of stator poles, which is separate from the latter.

In this embodiment, the windings Wu11, Wu12, Wv11, Wv12, Ww11, Ww12 of the first stator winding SW1 are likewise star-connected, and connected to the 12 V on-board network via a converter 4a with 6 circuit-breakers. The windings Wu21, Wu22, Wv21, Wv22, Ww21, Ww22 of the second stator windings SW2 are also star-connected, and connected to the 48 V on-board network via a further converter 4b with 6 circuit-breakers. Alternatively, delta connection is also possible in each case.

The synchronous machine according to FIG. 5 has symmetrical loading of the motor, and limited localized saturation, in the event of the unavailability of one of the two on-board networks or of one of the two output stages.

Figure 6:
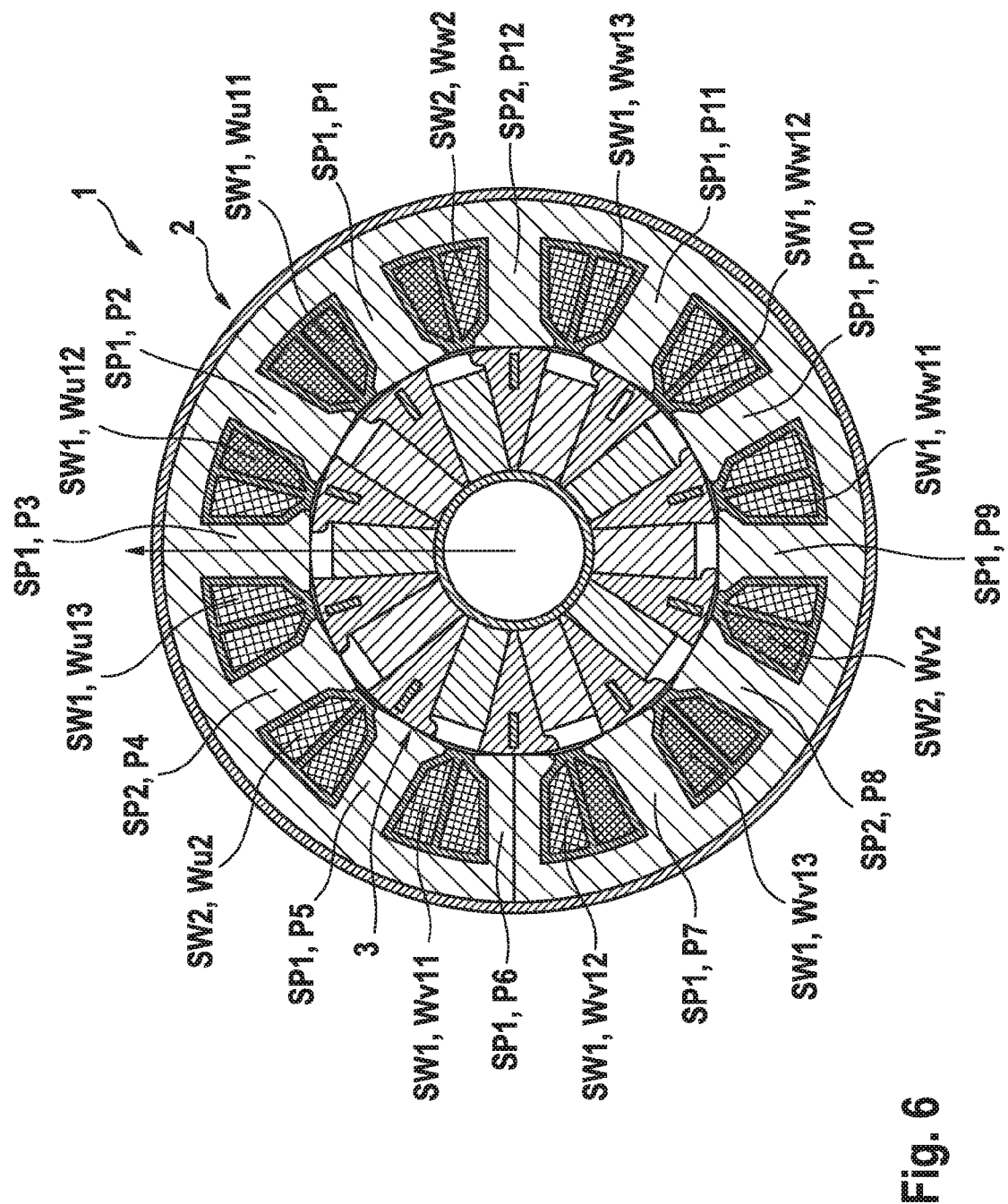
FIG. 6 shows a cross-sectional representation of a further permanent-magnet synchronous machine.

In the synchronous motors according to FIGS. 2, 4 and 5, the symmetrical division of the stator windings of the stator 2 has been applied. The application of an asymmetrical division—as represented in FIG. 6—is also possible. Thus, the stator 2 according to FIG. 6, having stator poles P1 to P12 and a 10-pole rotor 3, on the grounds of its 4-way symmetry, can be divided by a ratio of 3/4 to 1/4. A first stator winding SW1 with the windings Wu11, Wu12, Wu13, Wv11, Wv12, Wv13, Ww11, Ww12 and Ww13 is connected to the 48 V on-board network; a second stator winding SW2 with the windings Wu2, Wv2 and Ww2 is connected to the 12 V on-board network.

The division of the 12 stator poles P1 to P12 can be seen in FIG. 6. Thus, stator pole P1, P2 or P3 carries the winding Wu11, Wu12 or Wu13 of the first stator winding SW1, stator pole P4 carries the winding Wu2 of the second stator winding SW2, stator pole P5, P6 or P7 carries the stator winding Wv11, Wv12 or Wv13 of the first stator winding SW1, stator pole P8 again carries the stator winding Wv2 of the second stator winding SW2, etc. The stator poles P1, P2, P3, P5, P6, P7, P9, P10 and P11 thus constitute a first group SP1 of stator poles, and the stator poles P4, P8 and P12 constitute a second group SP2 of stator poles, which is separate from the latter.

Again, in this embodiment of a synchronous motor 1 according to the invention, the windings Wu11, Wu12, Wu13, Wv11, Wv12, Wv13, Ww11, Ww12 and Ww13 of the first stator winding SW1 are star-connected, in an identical manner to the three windings Wu2, Wv2 and Ww of the second stator winding SW2, and are respectively controlled by an associated converter 4a, 4b comprising 6 power semiconductors. The two stator windings SW1 and SW2 can also be delta-connected, or can be connected in a different manner, such that one stator winding is star-connected and the other stator winding is delta-connected.

A division of a stator 2 having 12 slots in a ratio of 3/4 to 1/4 is also possible in the case of a 8-pole rotor 3. Thus, a first stator winding SW1 with the windings Wu11, Wv11, and Ww11 is wound onto the consecutive stator poles P1 to P3 in the sequence described, and a second stator winding SW2 with the windings Wu21, Wv21, Ww21, Wu22, Wv22, Ww22, Wu23, Wv23 and Ww23 is arranged on a second group of stator poles P4 to P12, which is separate from the first group, in the sequence described.

Figure 7:
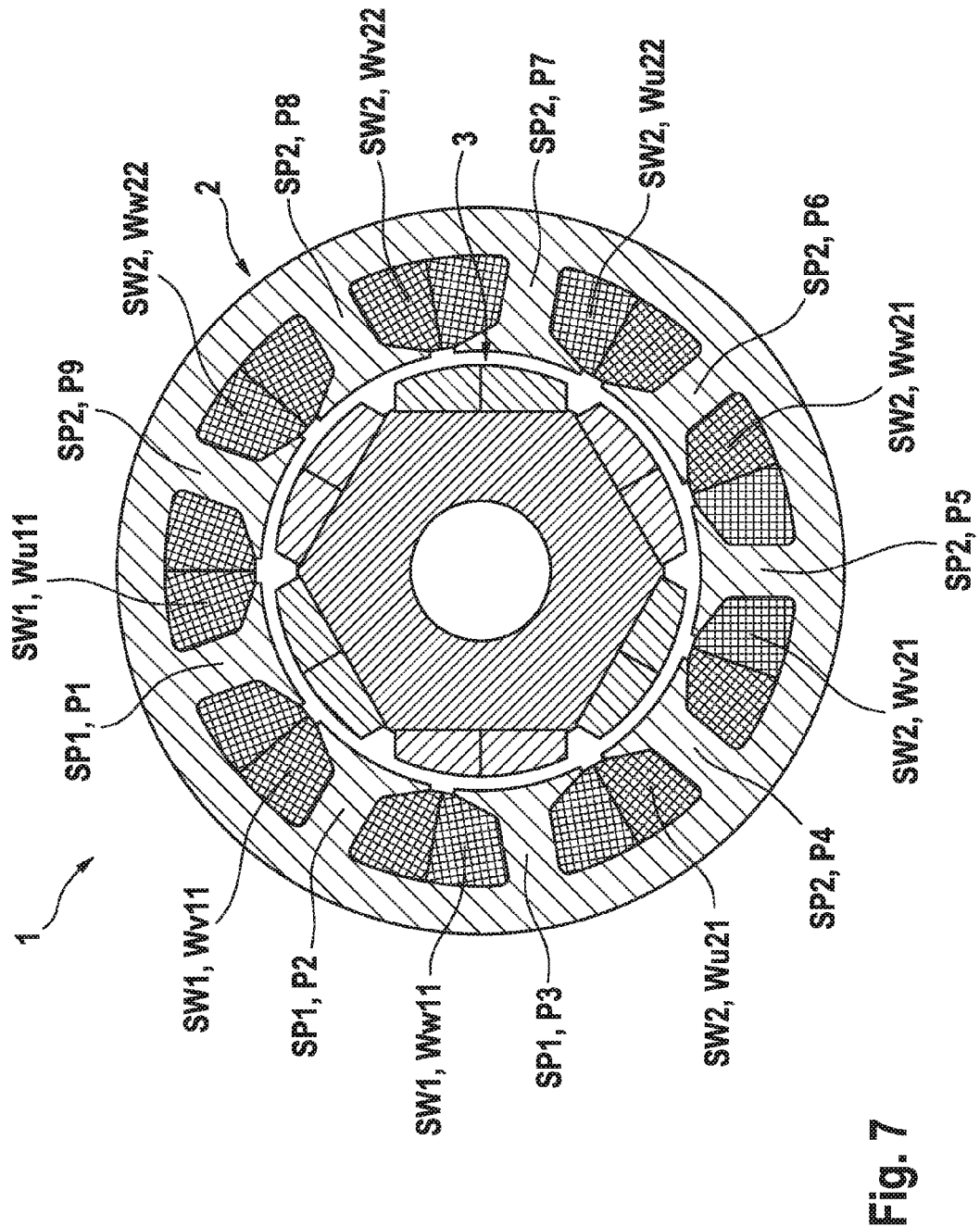
FIG. 7 shows a cross-sectional representation of a further permanent-magnet synchronous machine.

In the permanent-magnet synchronous machine 1 according to FIG. 7, an asymmetrical division of the stator poles between a first stator winding SW1 and a second stator winding SW in a ratio of 1/3 to 2/3 is likewise applied. This synchronous motor 1 comprises a 6-pole rotor and a stator with 9 slots. Thus, a first stator winding SW1 with the windings Wu11, Wv11 and Ww11 is wound onto the consecutive stator poles P1, P2 and P3 in the sequence described, thus constituting a first group SP1 of stator poles. A second stator winding SW2 with the windings Wu21, Wv21, Ww21, Wu22, Wv22 and Ww22 is wound onto the consecutive stator poles P3 to P12, thus constituting a second group SP2 of stator poles.

Various options are available for the connection of the two stator windings SW1 and SW2.

Thus, the first stator winding with the windings Wu11, Wv11 and Ww11 is star-connected or delta-connected. A star connection is employed for the second stator winding SW2, wherein the windings of one phase, i.e. the windings Wu21 and Wv21, the windings Ww21 and Wu22, and the windings Wv22 and Ww22 are connected in series or in parallel.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A permanent-magnet synchronous machine comprising:
    a rotor and a stator for holding at least one first stator winding;
    a second stator winding which is electrically insulated from said first stator winding, wherein the second stator winding has a smaller conductor cross-section and a larger number of turns than the first stator winding; and
    wherein the first stator winding is provided for motor operation with a first operating voltage, and the second stator winding is provided for motor operation at a second operating voltage with a higher rated voltage than a rated voltage of the first operating voltage.

2. The permanent-magnet synchronous machine of claim 1, wherein the connection of the first stator winding differs from that of the second stator winding.

3. The permanent-magnet synchronous machine of claim 2, wherein the first stator winding is star-connected and the second stator winding is delta-connected.

4. The permanent-magnet synchronous machine of claim 1, wherein the stator comprises a plurality of stator poles, separated by slots, for the accommodation of the at least first and second stator windings, wherein the first stator winding is arranged on a first group of stator poles, and the second stator winding is arranged on a group of stator poles which is separate from the first group.

5. The permanent-magnet synchronous machine of claim 4, wherein the stator and its first and second stator windings is configured such that the stator poles of the first and second group are respectively arranged in a consecutive sequence.

6. The permanent-magnet synchronous machine of claim 4, wherein the first group of stator poles and the second group of stator poles respectively constitute one half of the stator poles of the stator.

7. The permanent-magnet synchronous machine of claim 4, wherein the stator poles of the first group and the stator poles of the second group are arranged in an alternating manner.

8. The permanent-magnet synchronous machine of claim 4, wherein a multiple of two adjoining stator poles in the first group and the second group are arranged in an alternating manner.

9. A motor vehicle system comprising:
    at least one permanent-magnet synchronous machine having a rotor and a stator for holding at least one first stator winding, a second stator winding which is electrically insulated from said first stator winding, wherein the second stator winding has a smaller conductor cross-section and a larger number of turns than the first stator winding; and
    at least two independent voltage supplies with a first and second operating voltage, wherein the first operating voltage for the supply of the first stator winding has a lower rated voltage than a second operating voltage for the supply of the second stator winding.

10. The motor vehicle system of claim 9, wherein the connection of the first stator winding differs from that of the second stator winding.

11. The motor vehicle system of claim 10, wherein the first stator winding is star-connected and the second stator winding is delta-connected.

12. The motor vehicle system of claim 9, wherein the stator comprises a plurality of stator poles, separated by slots, for the accommodation of the at least first and second stator windings, wherein the first stator winding is arranged on a first group of stator poles, and the second stator winding is arranged on a group of stator poles which is separate from the first group.

13. The motor vehicle system of claim 12, wherein the stator and its first and second stator windings is configured such that the stator poles of the first and second group are respectively arranged in a consecutive sequence.

14. The motor vehicle system of claim 12, wherein the first group of stator poles and the second group of stator poles respectively constitute one half of the stator poles of the stator.

15. The motor vehicle system of claim 12, wherein the stator poles of the first group and the stator poles of the second group are arranged in an alternating manner.

16. The motor vehicle system of claim 12, wherein a multiple of two adjoining stator poles in the first group and the second group are arranged in an alternating manner.

* * * * *